United States Patent [19]

Hudson

[11] Patent Number: 4,789,323

[45] Date of Patent: Dec. 6, 1988

[54] RING MAKING APPARATUS

[76] Inventor: William R. Hudson, 713 Robin Rd., Birmingham, Ala. 35214

[21] Appl. No.: 60,638

[22] Filed: Jun. 11, 1987

[51] Int. Cl.[4] .............................................. B29C 43/34

[52] U.S. Cl. .................................. 425/352; 29/156.6; 425/138; 425/353; 425/DIG. 42

[58] Field of Search ............... 425/138, 344, 345, 352, 425/353, DIG. 42, DIG. 47, 153, 161; 29/34 R, 156.6; 72/135, 146; 264/DIG. 67

[56] References Cited

U.S. PATENT DOCUMENTS

| | | | |
|---|---|---|---|
| 2,319,373 | 5/1943 | Tormyn | 425/352 X |
| 2,468,797 | 5/1949 | Wong | 29/156.6 |
| 2,994,106 | 8/1961 | Posey | 425/352 X |
| 3,220,092 | 11/1965 | Wolfe et al. | 425/352 X |
| 3,244,782 | 4/1966 | Eyberger | 425/DIG. 42 |
| 3,507,009 | 4/1970 | Comly | 425/345 |
| 3,647,332 | 3/1972 | Schmaus | 425/344 X |
| 3,677,673 | 7/1972 | Shapiro | 425/345 X |
| 4,080,128 | 3/1978 | Schreiner et al. | 425/345 X |
| 4,104,014 | 8/1978 | Pearce | 425/345 |
| 4,345,889 | 8/1982 | Sizemore et al. | 425/138 X |

OTHER PUBLICATIONS

Hawley, G. G.; The Condensed Chemical Dictionary; 8th Edition; Reinhold Co.; p. 426; 1971.

*Primary Examiner*—Richard L. Chiesa
*Attorney, Agent, or Firm*—Jennings, Carter, Thompson & Veal

[57] ABSTRACT

Apparatus for forming graphite into packing rings utilizes a press to compress the graphite within a movable die. The graphite is supplied to the press by the combination of a turntable-type feeder and a tubular feeder which places increments of the graphite in dies carried by the turntable. The punch has a retractable pin which cooperates with a lower core pin to maintain the interior diameter of the rings as they are formed. The press and turntable are connected for synchronous operation.

12 Claims, 4 Drawing Sheets

RING MAKING APPARATUS

FIELD OF THE INVENTION

The present invention relates to the field of shaft packing and more particularly to the field of formed graphite rings for use as shaft packing. Even more particularly the present invention relates to apparatus for automating the production of solid graphite rings from GRAFOIL or braided graphite strands.

BACKGROUND OF THE INVENTION

Solid graphite rings are made from sheet graphite in the form of a foil available as GRAFOIL from Union Carbide Company and from braided graphite strands. Sheet graphite or GRAFOIL is brittle and tends to break unevenly when it is formed into a ring thus it is known to pass the sheet graphite through a device which "crinkles" or scores the surface of the sheet so that it may be manipulated into a desired shape. The crinkled or base graphite can then be wrapped around a dowel and layered to a desired thickness. The wrapped base graphite is rendered into a solid ring by compression in a press. Heretofore, the base graphite has been cut into strips having a width commensurate with the desired thickness of the finished ring; for example, the base graphite may be cut into strips one-half inch wide to form a ring having a one-quarter inch thickness. In the processes with which I am familiar, the base graphite strips are manually fed into a wrapping device which wraps the strip around a dowel corresponding to the desired inside diameter of the finished ring. The coiled strip is then manually removed and placed in a die for compression and thereafter removed. Essentially, the same process is followed in utilizing braided graphite as the base graphite. It may be seen that the formation of rings in this manner is a tedious and labor intensive process, which leaves much to be desired in terms of efficiency and economy.

SUMMARY OF THE INVENTION

It is the principal object of my invention to automate the manufacture of solid graphite rings.

Another object of my invention is to provide a means for increasing the rate of production of such rings.

Yet another object of my invention is to make such rings even more economically.

As may be seen from the background material, the principal problem with the conventional manufacturing of such rings is the need for an operator. The operator controls the rate of production by his rate of feed and removal of the graphite at the various stages of production. My apparatus simplifies the task to be performed by the operator by reducing his responsibilities to simply loading rolled base graphite into the apparatus. The apparatus then feeds and cuts the base graphite into appropriate increments, loads the increments into dies for compression into rings, and ejects the finished rings.

As a feeder mechanism, I use a tubular member having an inner diameter commensurate with the outer diameter of the ring to be formed. Pressurized air or some mechanical means is used to urge the base graphite through the tubular member, and a saw-like member segments the base graphite into increments which are discharged from the tubular member into one of a plurality of dies carried by a rotating turntable or the like which positions the die beneath a punch for compression of the base graphite, the turntable then carries the formed ring to an ejection port. The turntable is driven by the motion of the punch mechanism which also drives an ejector ram and the reciprocal motion of the saw such that the movement of the entire apparatus is timed for coincident loading, compression, and ejection of the product at the various stations of the apparatus.

BRIEF DESCRIPTION OF THE DRAWINGS

Apparatus embodying features of my invention are depicted in the accompanying drawings which form a portion of this application and wherein.

DESCRIPTION OF A PREFERRED EMBODIMENT

Figure 1:
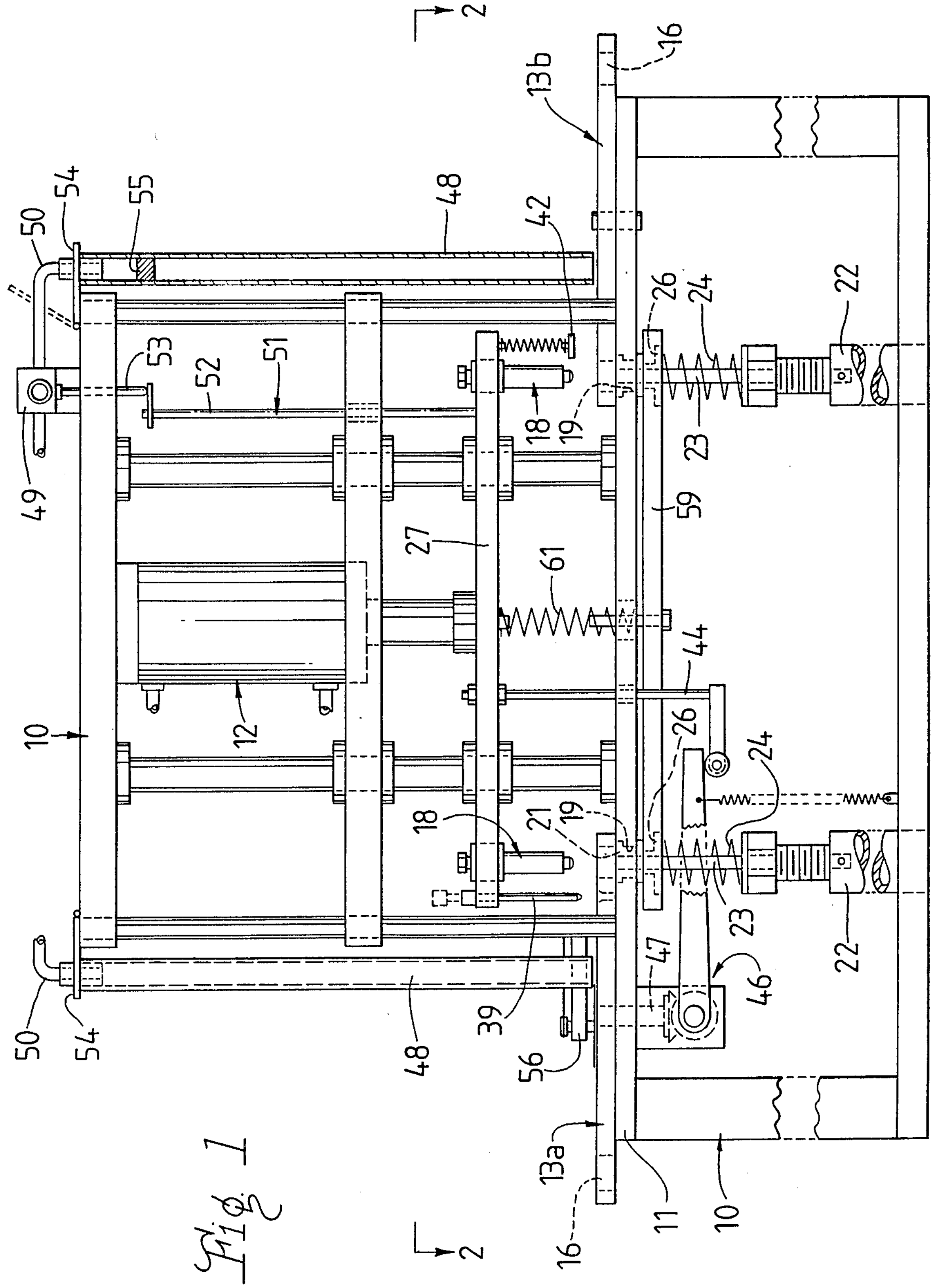
FIG. 1 is a side elevation of my apparatus.
Figure 2:
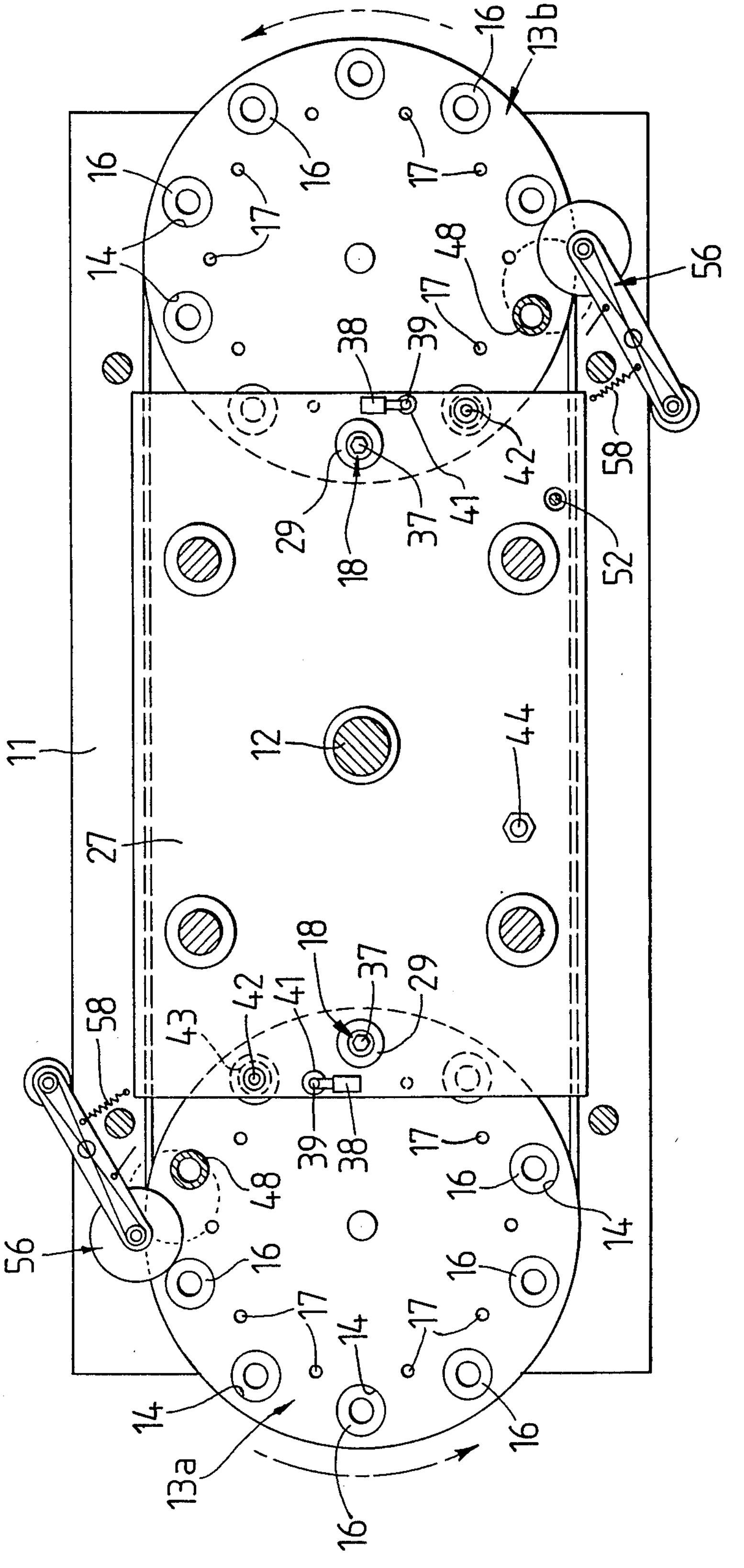
FIG. 2 is a sectional view of the apparatus taken generally along line 2—2 of FIG. 1.
Figure 4:
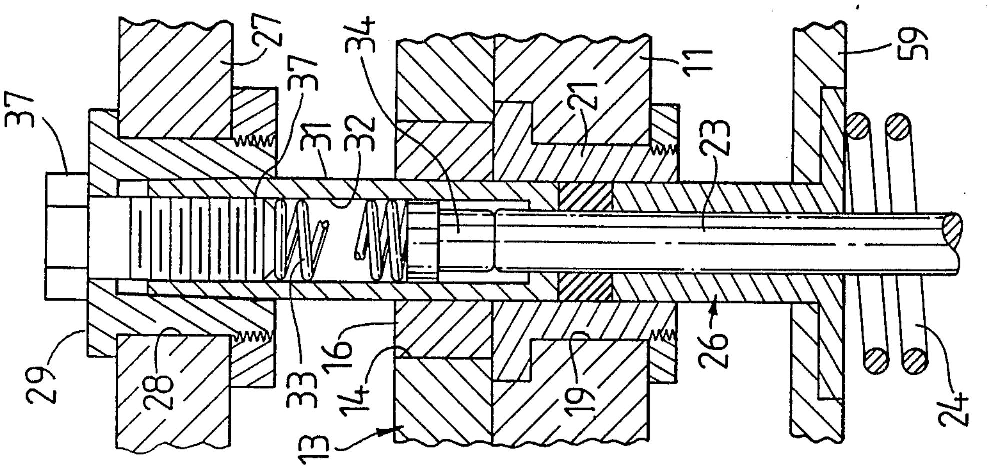
FIG. 4 is a partial sectional view of the press and die showing the press in the lowered position.
Figure 3:
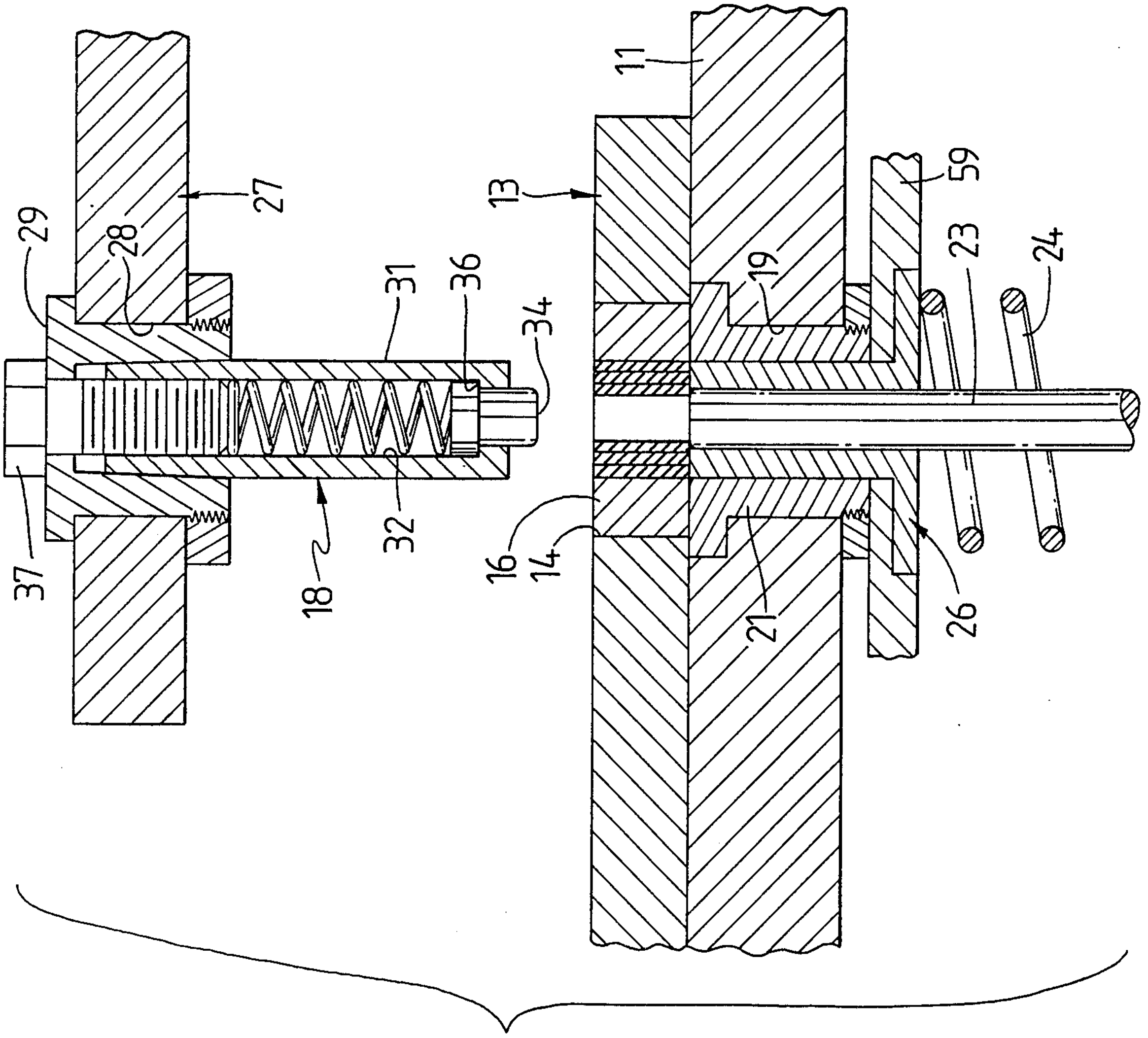
FIG. 3 is a partial sectional view of the press and die used in the invention showing the press in the raised position.
Figure 5:
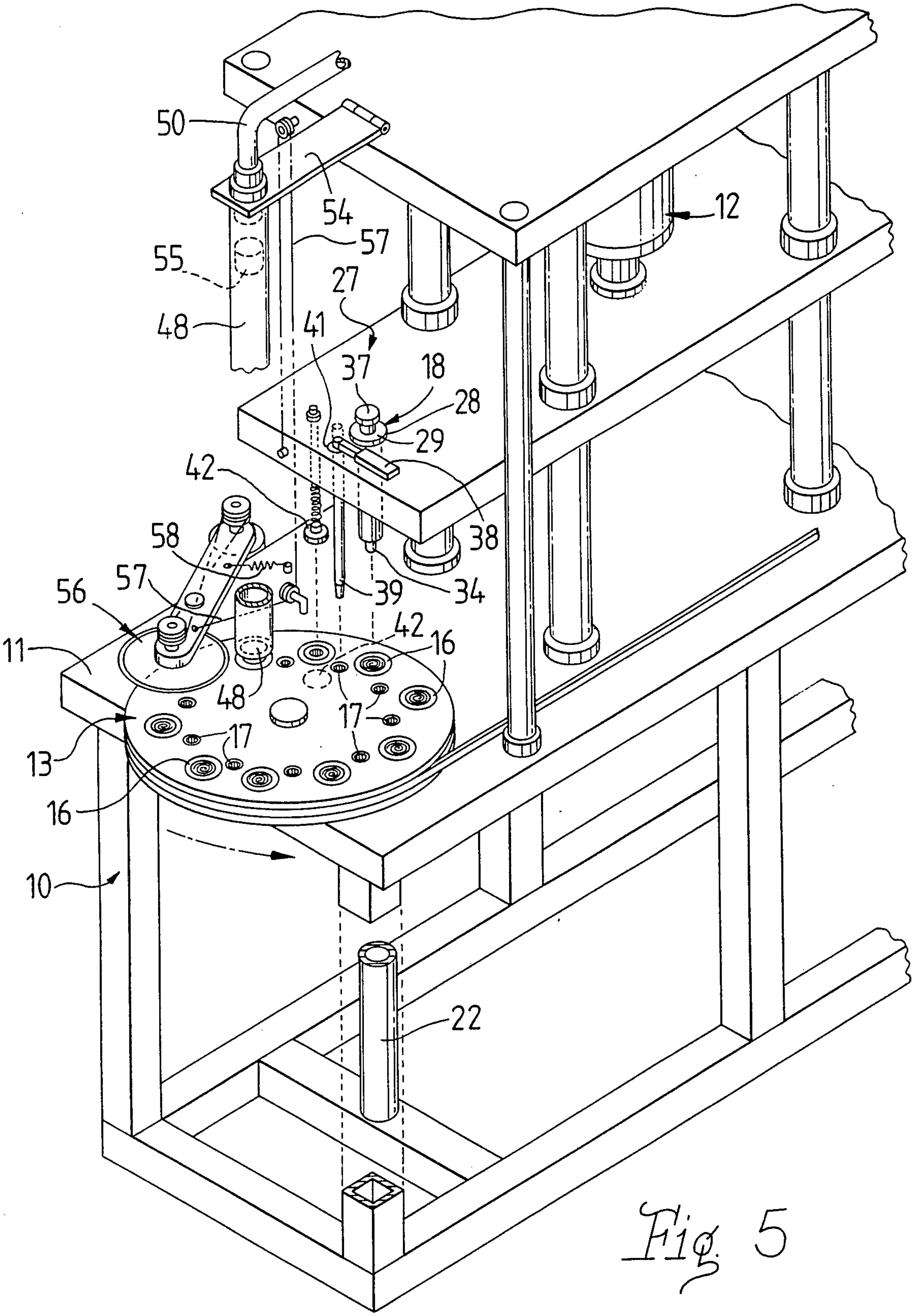
FIG. 5 is a perspective view.

With reference to FIG. 1, it may be seen that my invention includes a frame 12 whose members are selected to provide substantial strength and to endure the forces normally associated with metal working. The frame 10 supports and has integrated therewith a table top 11 and a hydraulic ram 12. Mounted to rotation on the table top 11 is a dial feeder 13 or turntable. In the illustrated embodiment two such feeders 13*a* and 13*b* are shown on opposite sides of the ram 12; however, it will be understood that as many feeders 13 as may be serviced by the ram 12 can be utilized to further enhance the efficiency of the apparatus. Each dial feeder 13 has a plurality of apertures 14 evenly spaced circumferentially near the periphery thereof. Each aperture 14 provides a seat for a die member 16 which may be carried therein. Each aperture 14 has associated with it and spaced from it a registry aperture 17, the purpose of which will become apparent hereafter. The ram 12 carries a punch member 18 for each feeder 13. The punch member 18 cooperatively engages the dies 16 when properly positioned by the dial feeder 13. The table top 11 has an aperture 19 therethrough, vertically aligned with each punch member 18, within which a collar 21 is positioned to cooperate with the die member 16 to receive the base graphite during compression. Beneath the aperture 19 is a column 22 extending from the floor to just below the table top 11. The column 22 has affixed to its top a cantilevered pin 23 which extends up into the aperture 19. Concentrically mounted about the pin 23 is a compression spring 24 which supports a movable die element 26 which extends about the pin 23 into the aperture 19 and collar 21.

Each punch 18 is carried by a press plate 27 in an aperture 28 and collar 29. The press plate 27 moves concomitantly with the ram 12 to assure simultaneous engagement of each punch 18 with the associated dies 16. Each punch includes a generally cylindrical outer member 31 having an axial bore 32 therethrough and a 2° taper on the outside of the upper end thereof. Mounted within the outer member 31 is a spring 33 which urges a pin-like member 34 against the lower inside of the outer member 31 where the bore 32 is restricted by an annular shoulder 36. The pin-like member 34 extends from the lower end of the punch when the spring 33 is fully expended. A threaded bolt 37 engages the cylindrical member 31 at the upper end and urges it into the collar 29. The end of this bolt 37 provides a base for spring 33.

The press plate 27 also carries a kill switch 38 for each dial feeder 13 employed. The kill switch 38 is actually a limit switch which is mounted to the press plate 27 for concomitant movement therewith. Associated with the kill switch 38 is a registry finger 39 which is supported in a sleeve 41 beneath the kill switch 38. The registry finger 39 is displaced laterally from the aperture 19 such that when the apertures 14 are aligned with aperture 19 in the table top 11 the registry finger 31 is aligned with the aperture 17. Thus, as the ram 12 descends the finger 39 is inserted into aperture 17. If the finger 39 fails to register in the aperture 17, the sleeve 41 allows the ram 12 to descend until the top of the finger 39 trips the kill switch 38 which halts the ram 12 until it is reset. In as much as the finger 39 extends below the punch 18, the punch does not contact the dial feeder 13 when misaligned.

The press plate 27 additionally has depending therefrom an ejection member 42 which is a spring loaded probe which is positioned over the dial feeder 13 such that during the compression stroke of the ram 12 the ejector 42 urges a previously formed ring out of the die 16, through an ejection aperture 43 formed in table top 11. That is to say, the ejector 42 is centered on the arc formed by the apertures 14 at a position equal to the separation therebetween from the punch 18.

It will be appreciated that the dial feeder and the ram 12 must be synchronized so that the punch 18 may properly engage the aperture 14. I have chosen to achieve synchonization by driving the dial feeder 13 with the ram 12. A drive rod 44 extends from the press plate 27 through the table top 11. Beneath the table top 11 the drive rod 44 engages a ratchet drive 46 for the drive shaft 47 of the dial feeder 13. The ram 12 powers the ratchet drive 46 to rotate the shaft 47 which in turn drives the dial feeder 13 through a set of conventional gears. The ratchet drive 46 is spring biased to engage the drive shaft 47 during a predetermined portion of the up stroke only and to disengage therefrom during the remainder of the up stroke. In this manner, the drive 46 moves the dial feeder 13 through an arc equal to the separation between the center of the preforming dies 16 as the ram 12 ends its up stroke. While the punch 18 is through the preforming die 16, the ratchet drive 46 disengages the drive rod 44 and the dial feeder is stopped while the punch 18 compresses the base graphite in the forming die and is withdrawn. Simultaneously the ejection member 42 urges a previously formed ring through the ejection aperture 43.

While the foregoing components present distinct advantages over the prior art in terms of forming the rings, particularly with respect to the interaction of punch 18, pin 23, and pin-like member 34, it is the hereinafter described feeder and cutter components which, when combined with the foregoing feature, do the most to enhance the speed and efficiency of this apparatus.

As a feeder, I use an elongated tube 48 havng an inner diameter commensurate with the inner diameter of the dies 16. The base graphite is rolled into coils within the tube 48 such that a column of graphite is disposed above the dial feeder 13. As a preforming die comes into position beneath the tube 48 the graphite descends into the preforming die 16 due to gravity or may be urged therein by air pressure from an air valve 49 connected to shop air or a compressor, or mechanically as may be convenient. The valve 49 is opened and closed responsive to the stroke of ram 12 by a linkage 51 which includes an actuator actuator arm 52 exending upwards from press plate 27 to engage a rod 54 which closes the valve 49. Air is fed to the tube 48 via an air line 50 which passes through a holder 54 which is pivotally mounted to the top of frame 10 and which closes the top of tube 48. The holder 54 may be locked in position atop the tube 48 to resist being raised by air pressure within the tube. It may also be necessary to place a retainer 55 atop the GRAFOIL to prevent the air from passing through the center thereof so that the GRAFOIL will be forced to move down the tube 48. During the down stroke of the ram 12, the dial feeder 13 remains stationary beneath the tube 48 to allow the preforming die to be filled and the graphite to be segmented. When GRAFOIL is used, a horizontally disposed rotating knife or saw 56 is urged laterally through the GRAFOIL in a plane intermediate the tube 41 and feeder 13 to sever the portion in the die 16 from the remainder of the column. The knife 56 is retracted as the ram 12 returns to its uppermost position. The knife 56 may be connected to the ram 12 by a linkage assembly; however, I have found a simple pulley system 57 to be sufficient. A spring 58 biases the knife 56 away from the bottom of the tube 48 and the pulley system 51 urges the knife 56 into the cutting position.

When braided graphite is used as the base graphite the knife 56 is vertically disposed and need not be moved by the ram 12. Rather the knife simply cuts along one side of the column thereby segmenting the strands which then pass into the dies 16. It will be appreciated that the GRAFOIL may be manually rolled for insertion into the tube as may the braided graphite and it is believed that there are devices which can also be utilized to perform this function.

In operation the base graphite is rolled to the appropriate thickness and inserted into the tube 48 and urged toward the bottom thereof by air pressure, gravity, springs or any other means for urging the material through the tube 48. The hollow column of graphite thus formed will rest on the upper surface of the dial feeder 13 while the dial feeder is in motion. The dial feeder 13 comes to rest at the end of each up stroke of the ram 12 with a die 16 aligned beneath the tube 48, another die 16 aligned beneath punch 18, and another die 16 aligned beneath the ejector 42. As the ram 12 descends on the compression stroke pulley system 57 urges the knife 56 beneath the tube 48 between the tube 48 and the dial feeder 13 thereby severing the GRAFOIL within the die 16 from the GRAFOIL remaining in the tube. Simultaneously, punch 18 descends. The pin-like member 34 abuts pin 23 and stops as the cylindrical member descends through die 16 and into collar 21 around pin 23. The force exerted by the ram compresses the spring 24 until the movable die element 26 is seated. Compression of the base graphite occurs within the collar 21 between the punch 18 and movable die element 26.

The movable die element 26 may be connected to a plate 59 which is also connected to the press plate 27 by a spring 61 such that the ram 12 is coupled to the movable die element 26 to assure that the springs 24 return the element 26 to their full up position during the up stroke of the ram 12 and before the dial feeder 13 begins to rotate. The repositioning of the movable die element 26 places the compressed graphite ring back within the preforming die 16.

Also simultaneously on the down stroke of ram 12 ejector 42 urges a previously compressed ring downwardly out of die 16 and through the table top 11.

As soon as the registry finger 39 is retracted from aperture 17, the drive rod 44 engages the ratchet drive 46 and causes the dial feeder 13 to rotate an angular increment equal to the spacing between the apertures 14. When the rotation stops the empty die 16 is positioned beneath tube 48, a die 16 filled with uncompressed graphite is beneath the punch 18, and a die 16 containing the just compressed ring is beneath the ejector 42.

It will be appreciated that, the registry finger 39 will prevent the damage to the apparatus in the event the dial feeder 13 is somewhat misaligned. Equally important, however, is the construction of the punch 18. It is noteworthy to mention that if the bore 32 of the punch 18 were left open, graphite from the inner layers of the base material in the preforming dies 16 would soon accumulate within the bore 32 and it would be necessary to cease operation of the apparatus to clear the bore 32. The retractable pin-like member 34 prevents such accumulation and eliminates the need for frequent stops to clear the machine.

When the supply of GRAFOIL in the tube 48 ie exhausted, the operator need only pivot the flexible air line 50 on its holder 54 away from the top of the tube 48 and insert another sheet of rolled GRAFOIL.

By way of example, a prototype of this apparatus having two dial feeders each carrying ten preforming dies have been operated at a rate of 25 strokes per minute which yields 50 finished rings per minute. During an eight-hour shift, then it may be seen that as many as 20,000 rings could be produced with the prototype, whereas the production rates known to me using other methods and apparatus yield about 2,000 rings per eight-hour shift.

While I have shown my invention in two forms, it will be obvious to those skilled in the art that it is not so limited but is susceptible of various changes and modifications without departing from the spirit thereof.

What I claim is:

1. Apparatus for forming graphite into rings comprising:
  - (a) feed means for supplying base graphite in the form of elongated strips, including tubular housing means having a selected inside diameter for holding said elongated strips of base graphite in a preformed coiled condition about a vertical axis;
  - (b) means for separating said base graphite into increments thereof;
  - (c) forming means for compressing said increments of said base graphite into rings; and
  - (d) transport means receiving said increments of said base graphite from said feed means for moving said increments of said base graphite to said forming means.

2. Apparatus as defined in claim 1 wherein said forming means comprises:
  - (a) a plurality of dies carried by said transport means cooperatively formed for receiving said increments of base graphite from said feeder means; and
  - (b) means for compressing said base graphite into a ring including a punch having a retractable pin extending from the axial center thereof.

3. Apparatus as defined in claim 2 wherein said transport means comprises a turntable mounted for discontinuous rotation to sequentially position each of said plurality of dies cooperatively with respect to said feed means and said means for compressing with said turntable being driven by said means for compressing.

4. Apparatus as defined in claim 3 further comprising disabling means for stopping said means for compression when said turntable is not properly aligned with said means for compression.

5. Apparatus as defined in claim 1 wherein said means for separating comprises:
  - (a) a driven saw member mounted for horizontal movement in a plane intermediate said feed means and transport means for cutting said strips; and
  - (b) means for moving said saw member synchronously with said transport means and said forming means such that increments of said base graphite in said transport means are severed from the base graphite remaining in said feed means.

6. Apparatus for forming rings from base graphite comprising:
  - (a) feed means for providing increments of base graphite foil formed into rolled strips having a predetermined volume and shape including a tubular member having a selected inside diameter for holding said rolled strips of said base graphite in a preformed rolled condition about a vertical axis and means for separating said base graphite into said increments thereof;
  - (b) compression means for compressing said graphite foil into rings including means for maintaining a predetermined inside diameter for said rings; and
  - (c) transport means for moving said increments of base graphite foil to said compression means from said feed means.

7. Apparatus as defined in claim 6 wherein said feed means comprises:
  - (a) said tubular member having a predetermined inside diameter cooperatively positioned adjacent said transport means; and
  - (b) means for urging said graphite strips through said tubular member to said transport means.

8. Apparatus as defined in claim 7 wherein said compression means comprises:
  - (a) a driven punch cooperatively positioned for reciprocal motion perpendicular to the plane of travel of said transport means;
  - (b) a plurality of preforming dies carried by said transport means and sequentially positioned thereby for cooperative insertion of said punch;
  - (c) a movable die element mounted beneath said punch and resiliently biased theretowards;
  - (d) confinement means positioned coaxially with said movable die element, cooperatively receiving said punch for compressing said graphite against said movable die member therewithin; and
  - (e) forming means extending coaxially through said confinement means defining a central core about which said graphite is compressed.

9. Apparatus as defined in claim 7 wherein said means for separating comprises:
  - (a) a driven saw member mounted for horizontal movement in a plane intermediate said feed means and transport means for cutting said strips; and
  - (b) means for moving said saw member synchronously with said transport means and said forming means such that increments of said base graphite in said transport means are severed from the base graphite remaining in said feed means.

10. Apparatus as defined in claim 6 wherein said compression means comprises:

(a) a driven punch cooperatively positioned for reciprocal motion perpendicular to the plane of travel of said transport means;

(b) a plurality of dies carried by said transport means and sequentially positioned thereby for cooperative insertion of said punch;

(c) a movable die element mounted beneath said transport means and said punch and resiliently biased theretowards;

(d) confinement means positioned coaxially with said movable die element, cooperatively receiving said punch for compressing said graphite against said movable die member therewithin; and (e) forming means extending coaxially through said confinement means defining a central core about which said graphite is compressed.

11. Apparatus as defined in claim 10 wherein said punch comprises:

(a) an outer cylindrical member having an axial bore substantially equal to said central core;

(b) a pin mounted within said axial bore and extending therefrom; and (c) means for biasing said pin toward said forming means, with said pin and said forming means being cooperatively positioned to maintain the inner diameter of said rings during the compression thereof.

12. Apparatus as defined in claim 6 further comprising means for connecting said feed means, transport means and said compression means for synchronous operation responsive to the movement of said compression means.

* * * * *